United States Patent [19]
Wood

[11] Patent Number: 5,199,354
[45] Date of Patent: Apr. 6, 1993

[54] MOBILE SOIL REMEDIATION SYSTEM

[75] Inventor: Kenneth L. Wood, Apopka, Fla.

[73] Assignee: TPS Technologies, Inc., Apopka, Fla.

[21] Appl. No.: 840,640

[22] Filed: Feb. 21, 1992

Related U.S. Application Data

[63] Continuation of Ser. No. 545,685, Jun. 28, 1990, abandoned, which is a continuation of Ser. No. 273,378, Nov. 18, 1988, abandoned.

[51] Int. Cl.[5] ............................................. F23G 7/00
[52] U.S. Cl. ............................................. 110/241; 110/346; 34/80; 34/135; 47/1.42
[58] Field of Search ............... 110/234, 235, 346, 229, 110/246, 241; 34/133, 86, 179, 181, 135, 136, 137; 47/1.42; 588/234, 235

[56] References Cited

U.S. PATENT DOCUMENTS

| | | | |
|---|---|---|---|
| 2,127,328 | 8/1938 | Egan | 110/14 |
| 2,703,706 | 3/1955 | Bishop | 263/19 |
| 2,862,462 | 12/1958 | Brandt et al. | 110/8 |
| 2,977,255 | 3/1961 | Lowry | 134/2 |
| 3,307,507 | 3/1967 | Boyd et al. | 110/8 |
| 3,606,877 | 10/1969 | Shipp | 126/271.2 A |
| 3,682,117 | 8/1972 | Bousseau | 110/14 |
| 3,705,711 | 12/1972 | Seelandt et al. | 263/32 R |
| 3,728,976 | 4/1973 | Domnitch | 110/8 |
| 3,906,874 | 9/1975 | Jaronko et al. | 110/14 |
| 3,912,598 | 10/1975 | Dick | 202/185 |
| 4,359,951 | 11/1982 | Dauvergne | 110/234 |
| 4,376,373 | 3/1983 | Weber et al. | 60/648 |
| 4,627,365 | 12/1986 | Tseng | 110/240 |
| 4,667,609 | 5/1987 | Hardison et al. | 110/236 |
| 4,700,638 | 10/1987 | Przewalski | 110/346 |
| 4,730,564 | 3/1988 | Abboud | 110/246 |
| 4,738,206 | 4/1988 | Noland | 110/346 |
| 4,748,921 | 6/1988 | Mendenhall | 110/346 |
| 4,782,625 | 8/1988 | Gerken et al. | |
| 4,864,942 | 9/1989 | Fochtman et al. | 110/226 |
| 4,951,417 | 8/1990 | Gerken et al. | |

OTHER PUBLICATIONS

Asphalt Plant Manual, Manual Series No. 3 (4th Ed. Dec. 1974) published by The Asphalt Institute, College Park, Md., pp. 7-23, 35, 44, 45, 47, 52-54.

*Primary Examiner*—Henry A. Bennet
*Attorney, Agent, or Firm*—Warren L. Franz

[57] ABSTRACT

An improved heat evaporation soil remediation system has feeder bin, rotary dryer and baghouse elements integrated as a single compact unit onto a readily transportable trailer platform. Contaminated soil is fed by means of an auger and slinger belt into an oil burner fired rotary drum for heating by flight induced veiling action and evaporation of volatile contaminants from the soil. Dust-laden exhaust air is cleaned by air expansion and bag filters in a baghouse located over and straddling the dryer. The bags are maintained in position by springs to prevent excessive movement during travel.

25 Claims, 5 Drawing Sheets

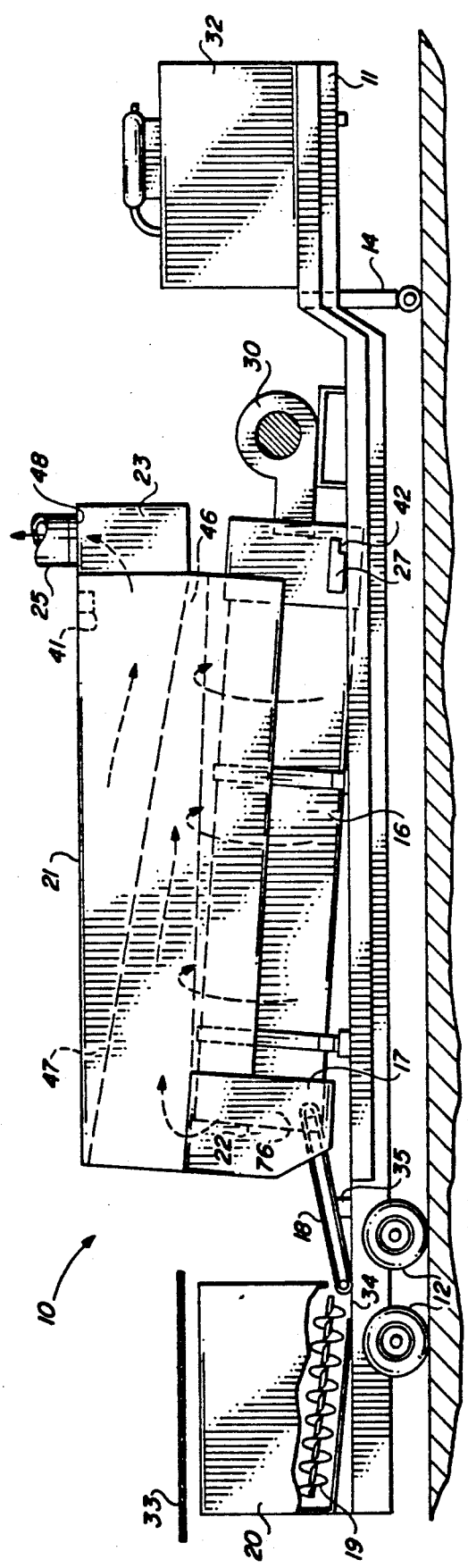
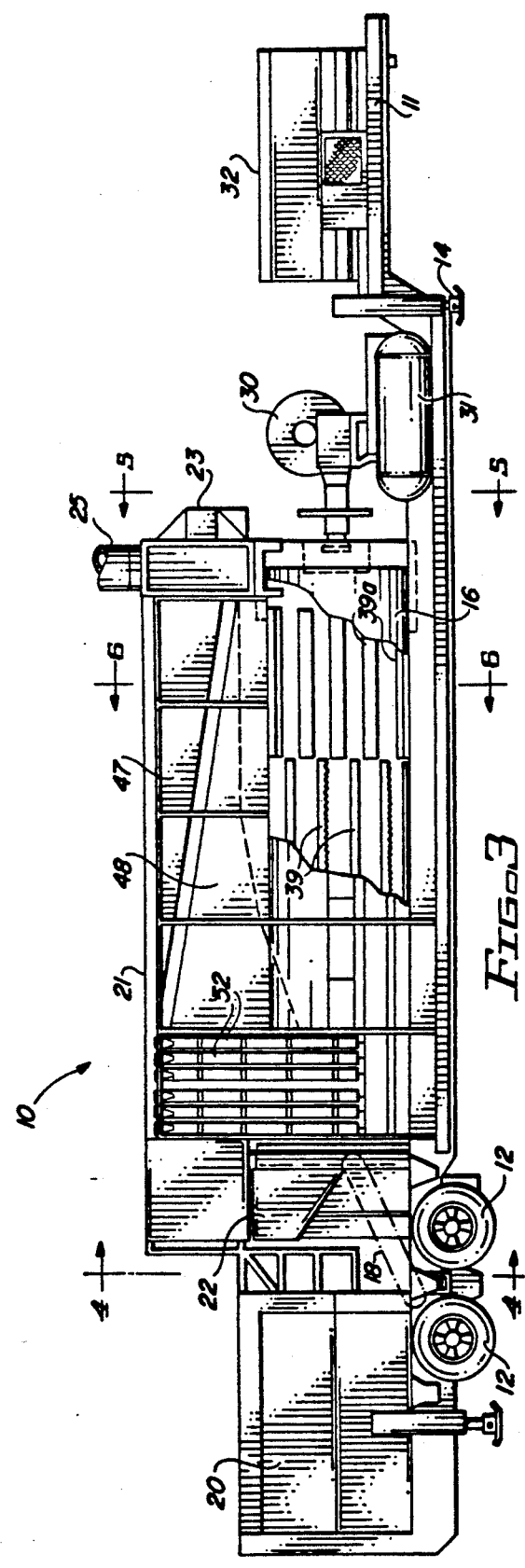

MOBILE SOIL REMEDIATION SYSTEM

This application is a continuation of application Ser. No. 545,685, filed Jun. 28, 1990 now abandoned which is a continuation of Ser. No. 07/273,378 filed Nov. 18, 1988 now abandoned.

This invention relates to a compact, mobile system for the heat removal of volatile contaminants from soils, especially from soils saturated with petroleum hydrocarbon contaminants.

BACKGROUND OF THE INVENTION

It is known in general to remove volatile contaminants from soils, such as hydrocarbon saturated coil following an oil or petroleum spill, by heating the soil and driving off the contaminants through evaporation. Contaminated soil introduced into an elevated feeder end of a rotary dryer drum is mixed with heat supplied by a burner having a flame directed into the dryer. The heat drives the contaminants from the soil and into air drafted through the drum. The air is exhausted to a dust collector for cleaning before being released to a stack for venting to the atmosphere or to some other collection point. The cleaned soil is recovered at the discharge end of the drum.

The apparatus employed in such soil remediation process is not unlike that employed in a hot-mix process for coating aggregate with asphalt to produce highway paving materials and other similar bituminous mixtures. In the latter process, aggregate material stored in a feed bunker or bin is metered by gravitational or mechanical means at a controlled rate onto a conveyor belt or other transporter for delivery to an elevated end of an inclined rotary dryer drum, where it is dried and heated by the flame and hot gases produced by an oil or gas burner. After the aggregate is heated and coated with asphalt, the hot mix is recovered at the lower end of the drum, and discharged to a storage bin. Such hot-mix plant systems are described in the *Asphalt Plant Manual,* Manual Series No. 3 (4th ed. Dec. 1974) published by The Asphalt Institute, College Park, Md.

The conventional hot-mix asphalt plant dryer is a revolving cylinder, usually 3 to 10 feet in diameter and 15 to 40 feet long. It is equipped with longitudinal troughs or channels, called "flights," that lift the aggregate and drop it in uniform veils through the burner flame and hot gases. The length of time required for the aggregate to pass through the dryer is controlled by the slope of the cylinder, drum rotation speed, diameter, length, and arrangement and number of the flights. The dryer is normally designed to provide adequate heat and exhaust volume for a given input aggregate moisture content condition; and, the aggregate feed rate and fuel burn rate are appropriately adjusted to accommodate different moisture contents. For control of aggregate feed rate, provision is made to weigh the aggregate as it enters the dryer. To avoid overheating the aggregate during mixing, automatic control of burner temperature is provided in response to a temperature sensor installed within the aggregate stream in the dryer discharge path.

The hot-mix asphalt plant usually has one or more dust collectors for removing the dust generated during the mixing process from the exhausted air. Three commonly used types of dust collectors are mechanical collectors, fabric filters and wet scrubbers.

Mechanical collectors include skimmers and expansion chambers. These cause the settling out of heavier particles by decreasing the exhaust gas velocity. Mechanical collectors also include centrifugal ("cyclone") dust collectors which force the dust-laden air into a whirling motion to drive the dust particles outward by centrifugal force.

Fabric filters usually take the form of open-topped "bags" of felted, heat resistant fiber, held in cylindrical shape by internal frames, and vertically suspended within an airtight unit called a "baghouse." The baghouse is divided into a lower, dirty gas chamber and an upper clean gas chamber, with the bags hung so that exhaust air flows from the lower chamber from the outsides to the insides of the bags and into the upper chamber through the top openings. The size of the baghouse and number of filter bags used depends on the volume of exhaust air to be treated, the air-to-cloth ratio desired, and the cloth area per bag. A typical baghouse arrangement has several hundred bags, and includes a reverse-air jet or other mechanism to periodically remove dust cake buildup from the outsides of the bags. The baghouse dust collector is useful to remove the finer dust particles or "fines."

Wet scrubbers utilize water dispersed into droplets to entrap dust particles in the exhaust. Though wet scrubbers are efficient for cleaning the exhaust, they necessitate a source of water and also some means of disposal of the dust-laden water, which may itself become a pollutant.

The feeding, heating and dust collecting stages of known soil remediation systems, just as the corresponding stages of known hot-mix asphalt plant systems, comprise separate, isolated, often bulky components that must be individually transported to each new operation site and coupled together in a time-consuming assembly process, before soil contamination clean-up operations can begin.

SUMMARY OF THE INVENTION

It is an object of the invention to provide an improved integrated soil remediation apparatus that has integrated components to improve transportability and to reduce the time needed for setup prior to commencement of operations at a new site.

It is another object of the invention to provide an improved soil remediation method in which dust-laden air exhausted from a rotary dryer is directed through dust collection elements located above and straddling the dryer.

In one aspect of the invention, feeder bin, rotary dryer and dust collection components of a soil remediation system are integrated into a single, readily transportable, compact unit. The feeder bin is located at one end of the unit to act as a hopper for receiving the contaminated soil and dispensing it at a uniform, controlled rate. A rotary dryer drum is located centrally of the unit to receive the dispensed soil and heat it by means of a combustion burner with a flame directed into the drum. A dust collecting assembly in the form of a baghouse straddles the dryer, to direct air exhausted from the drum up and around the dryer through tangentially positioned filter bags for removal of dust therefrom. A control system located at the other end of the unit, controls feed rate, drum rotation and burner operations. In a preferred embodiment, described in greater detail below, auger means provided at the dryer drum discharge end and at the bottom of the baghouse, delivers cleaned soil and recovered dust to a common discharge point.

BRIEF DESCRIPTION OF THE DRAWINGS

Embodiments of the invention have been chosen for purposes of illustration and description, with reference to the accompanying drawings, wherein:

FIGS. 1 is a schematic view of the apparatus of the invention, illustrating the method of the invention;

FIG. 3 is a side elevation view, in cutaway, of an the embodiment of apparatus as in FIG. 1;

Throughout the drawings, like elements are referred to by like numerals.

DESCRIPTION OF THE PREFERRED EMBODIMENTS

Figure 2:
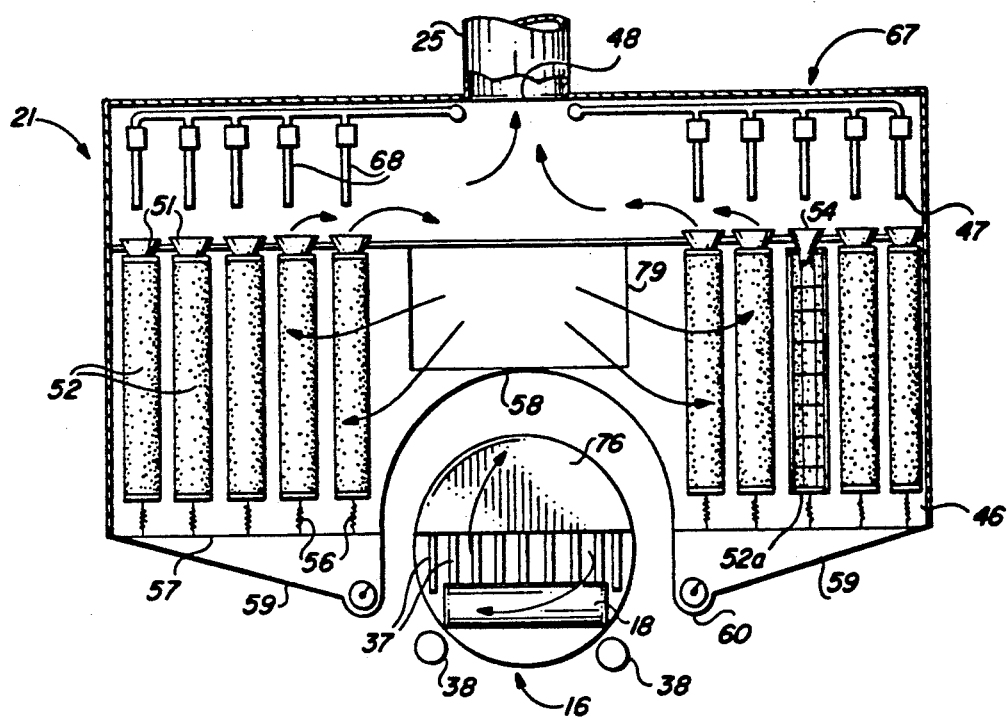
FIG. 2 is a schematic view looking from the burner end of FIG. 1.
Figure 4:
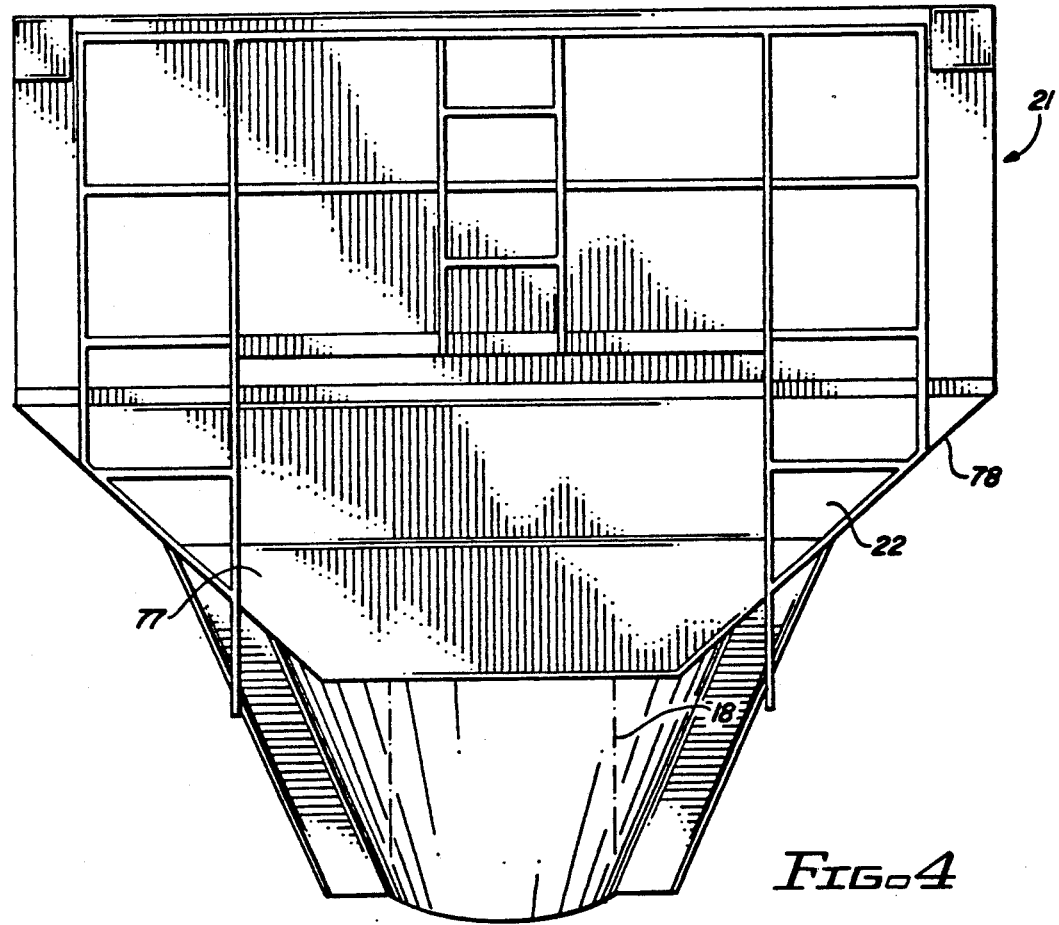
FIG. 4 is a partial rear end view taken along the line 4—4 of FIG. 3.

The principles of the apparatus and method of the present invention are described with reference to an embodiment of the apparatus thereof in the form of a trailer mounted mobile soil remediation unit 10 as shown in FIGS. 1-8, for heat removal by evaporation of volatile petroleum contaminants from a soil polluted therewith and with reference to a method thereof as set forth in FIG. 9.

As shown schematically in FIGS. 1 and 3, the illustrated unit 10 comprises an elongated trailer platform 11 supported at its rear end in conventional manner on wheels 12 and at its front end by hydraulic support legs 14. A dryer in the form of a trunnion mounted, rotary dryer drum 16 is centrally located in axial alignment with the platform 11 and inclined with its elevated end 17 (see FIG. 1) toward the rear end of the trailer. The end 17 of drum 16 has an opening addressed by a conveyor belt 18 arranged to deliver contaminated soil at a controlled uniform rate from an auger 19 discharge of a feeder bin or hopper 20 positioned at the rear of the platform 11. A dust collecting assembly in the form of a baghouse 21 straddles (see FIG. 3) the dryer drum 16, in communication therewith by means of a rear breeching 22 to draw the dust-laden exhaust air therefrom utilizing an exhaust fan 23, and to discharge the same after cleaning through a stack 25. An opening 27 at the lower end of the drum 16 serves as a discharge point for the cleaned soil and for dust recovered from the exhaust air by the baghouse 21.

An oil combustion burner 30 directed into the lower end of the drum 16 acts to heat the soil in the dryer for removal by evaporation of the contaminants. An oil tank 31 (FIG. 3) supplies fuel to the burner 30. Operation of the dryer 16, belt 18, auger 19, fan 23 and burner 30 is controlled by power delivered through a generator 32 and hydraulic lines and controls associated therewith. The generator 32 is conveniently located at the front end of the trailer 11.

A preferred feeder bin 20 has a rectangular top opening, parallel front and rear walls, and downwardly converging left and right walls with slopes of 60°. For a suggested 25 tons/hr., 5% moisture, soil processing capacity of unit 10, a 12 cu. yd. capacity (16.8 tons) of bin 20 has been found suitable. A steel mat or grizzly 33 (FIG. 1) located over the top opening of bin 20 serves to keep rocks, sticks and other large objects from clogging the system. A metal grate having 4"×4" openings is suitable for this purpose. Soil feed from the bottom of bin 20 to the conveyor 18 is preferably assisted by means of an auger 19 in the form of a hydraulically driven auger (viz. 18" diameter) located within the bottom of the bin 20 ahead of a gate 34. The auger may be driven by a geared down chain drive (not shown) in order to deliver material at a constant rate onto the belt 18.

The belt 18 is preferably a vulcanized rubber belt, suitably 24" wide, which is moved by a hydraulic rear drive on self-cleaning and self-centering pulleys (not shown). A weighing station and a belt speed sensor (indicated at 35 in FIG. 1) are advantageously provided for indicating the rate (e.g. 25 tons/hr.) at which material is being delivered to the dryer 16. The forward end of the belt 18 projects into the dryer drum at the bottom of its elevated opening 17 in order to "sling" the soil material into the drum. At the point of admission of the belt 18 into the dryer 16, heat shielding in the form of strips 37 (shown schematically in FIG. 2) hang down at the opening 17 from the lower end of the breeching 22 to protect the belt and the operating crew from the heat developed in the dryer 16.

The dryer 16 is a hydraulically driven cylindrical drum, which is suitably 5' in diameter and 22' long with a drum slope of $\frac{1}{4}$" per 12". The drum may be of the same kind as is commercially used in hot-mix asphalt plants to heat and mix aggregate with asphalt. The drum 16 is supported in known manner on trunnions 38 of the steel roller type which have 8" diameter, 5" face length and 3" shaft diameter, and the drum drive is a hydraulic motor. A suitable trailer platform 11 for use with the described bin 20 and drum 16 has a 55' length, 8½' width and W16×31 main beams. The drum 16 is set on the trailer 11, so that the desired drum incline can be achieved by adjustment of the support legs 14.

As shown in FIG. 3, the drum is provided with three spaced sets of longitudinally extending paddles or flights 39 shaped from ¼" steel plate. The flights are bolted to steel angle clips that have been welded to the drum interior in angled rows. The foremost set of flights 39a (those closest to the burner flame) are preferably formed as closed channels to keep the soil just prior to exiting the dryer 16 from dropping through the flame and interfering with heating.

The burner 30 is preferably a high momentum oil burner having a BTU rating of about 40,000,000 BTU/Hr., an oil pump of 8 GPM with automatic control, and flame relay and scanner safeguards. It should preferably be accommodated with a fuel oil atomization nozzle to achieve clean burning.

Combustion control is provided by standard Jenco Genie or similar commercially available controls, used to run the burner 30 as hot as possible. In contrast to typical asphalt hot-mix systems in which the burner is oscillated on and off in response to a temperature sensor located at the aggregate mix discharge point of the drum, the soil remediation system 10 has a sensor 41 located at the stack discharge point of the baghouse 21 to provide automatic control of the burner in response to the stack exit gas temperature. The burner 30 is kept as hot as possible within the limitations of the baghouse 21 filter elements discussed below. A second temperature sensor 42 is located at the remediated soil discharge point, to automatically adjust the speed of feed of contaminated soil from the bin 20 by belt 18. The temperature sensor 42 may be located in a discharge chute 43 at the opening 27 of the drum 16. A discharge auger 44 (see FIG. 5) may be used for carrying the cleaned soil away from the platform 11. A 12" auger extending laterally for 10'-12' and slanted at a 28° angle is suitable for this purpose. The sensor 42 determines that the soil is hot enough to drive off the contaminants before being discharged.

The generator 32 may be, for example, a Cummins diesel engine, 100 KW size, 277/480 volts, with 150 amps circuit breaker and 50 gallons base fuel tank. The exhaust fan 25 may be a radial type fan with a 10 HP, TEFC drive motor.

The described system will produce approximately the following tons per system hour of clean soil, depending on the moisture content and soil conditions:

| Moisture | tons/HR | Max BTU/Hr | GAL/Hr Fuel |
|---|---|---|---|
| 5% | 25 | 20,000,000 | 140 |
| 10% | 15 | 15,000,000 | 105 |
| 15% | 7 | 15,000,000 | 105 |

The stack 25 is an aluminum stack of known configuration which serves the purpose of venting the spent air at sufficiently high altitude for disposal to protect the work crew adjacent the system by keeping the ambient concentration of evaporated pollutants within acceptable standards. The stack 25 is made removable for storage above the bin 20, or otherwise, during transportation of the unit 10.

The baghouse 21 is divided into lower and upper airtight compartments constituting a "dirty air" chamber 46 and a "clean air" chamber 47, as shown. Each chamber has a central wedge-shaped longitudinal channel section located over the top of drum 16, and left and right side sections extending laterally and downwardly outward therefrom. The upper and lower walls of the central section of the dirty air chamber 46 converge to a closed end at the stack end of the baghouse 21; the upper and lower walls of the central section of the clean air chamber 47 diverge from the bin 20 end of the baghouse 21 toward an opening 48 at the stack 25. The chamber 46 has a generally planar top 49 provided with a plurality of apertures 51 (see FIGS. 2 and 7), from which cylindrical filter bags 52, of felted heat resistant fibers or the like, are hung vertically in arrays of rows and columns arranged in tangential positions on either side of drum 16. As shown for one of the bags 52a in FIG. 2, each bag 52 is provided with a support frame 53 having vertically spaced hoops and longitudinally extending ribs to maintain the cylindrical configuration of the bag. At the top of each bag 52, a horn 54 is inserted at the point of attachment of the bag 52. The openings 51 may be provided with upwardly projecting circular flanges (FIG. 6) about which a cuff at the top of each bag can be fitted. The horns 54 can then be inserted from the top into the apertures 51 to secure the bags 52 therein. The bottoms of the bags are closed and may be provided with grommets 55 (FIG. 6) for attachment by means of springs 56 to a securing bar 57. The downward biasing provided by the springs 56 serves to prevent the bags 52 from knocking against each other during transportation of the unit 10.

Figure 5:
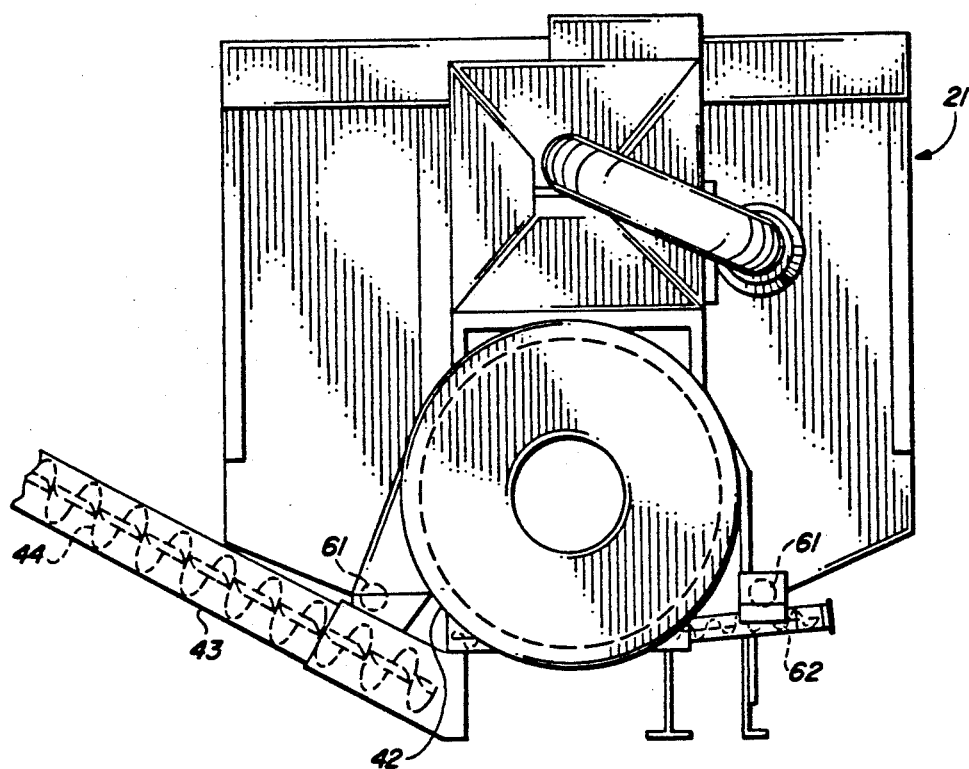
FIG. 5 is a partial front end view taken along the line 5—5 of FIG. 3.

The bottom wall of chamber 46 is comprised of a central elongated saddle portion 58 that straddles the top of the drum 16, and left and right inwardly slanted floor portions 59 that have longitudinally extending rounded channels 60 running along the inner edges thereof, interiorly of the chamber. Augers 61 (FIG. 8) are located within the channels 60 to deliver dust collected in the channels 60 out of the housing 21 to a common discharge point with the cleaned soil exited from the drum 16 at the opening 27. As shown in FIG. 5, the left auger 61 empties directly into the bottom of angled chute 43, and the right auger 61 empties into chute 43 indirectly by means of a transversely running intermediate auger 62 (see also FIG. 8).

Figure 7:
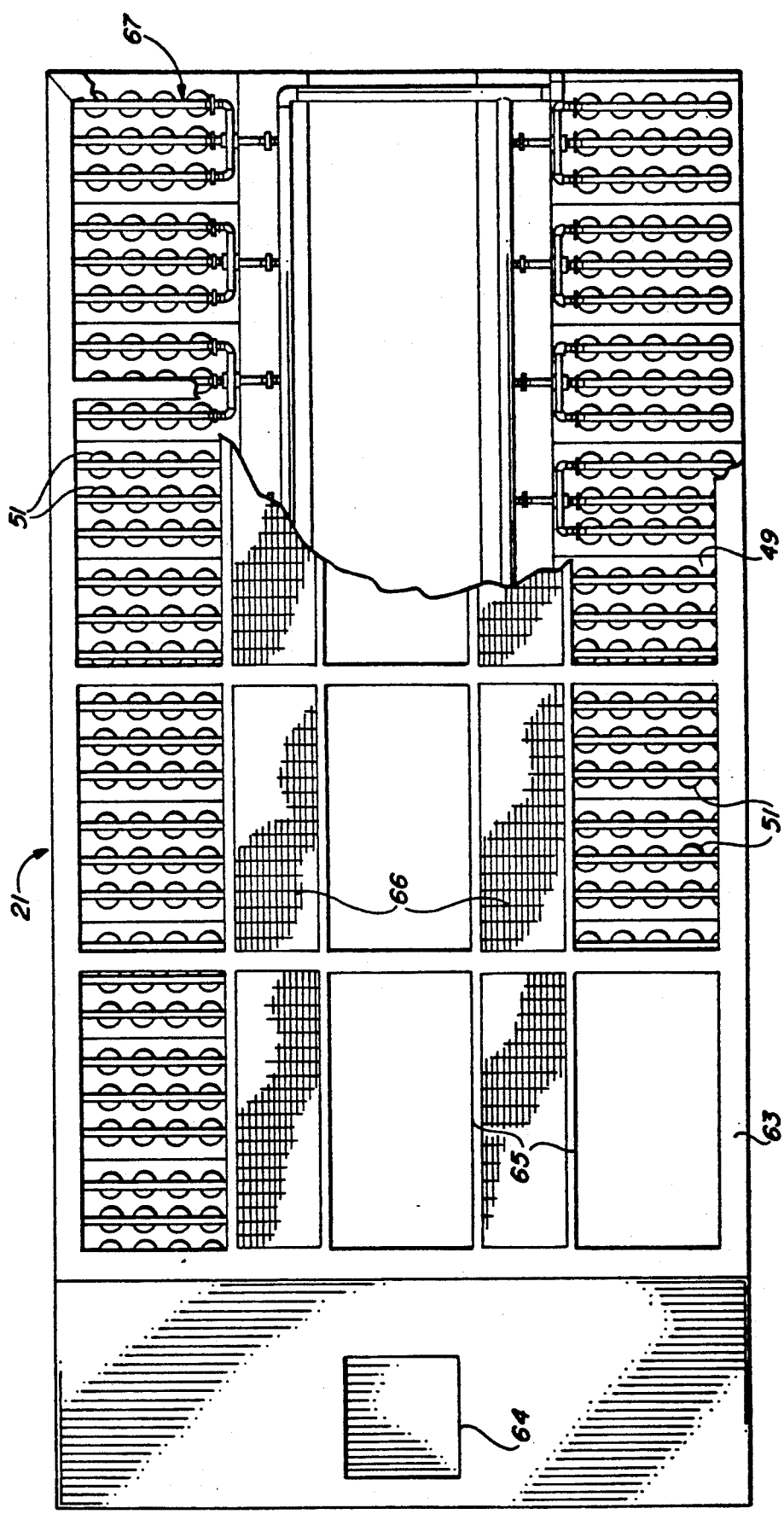
FIG. 7 is a top plan view, in cutaway and with portions removed, of the embodiment of FIG. 3.
Figure 8:
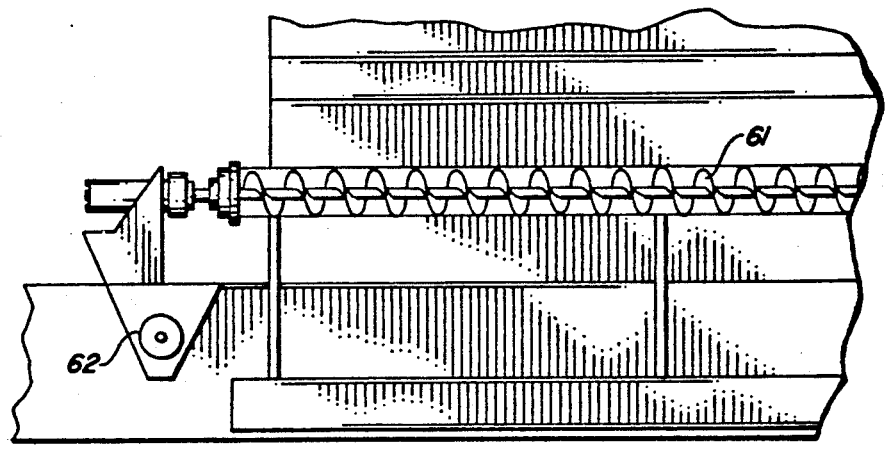
FIG. 8 is an enlarged schematic view of a portion of the embodiment of FIG. 1.

The top 49 of chamber 46 constitutes the bottom of the chamber 47. The top 63 of chamber 47 constitutes the top of the baghouse 21. The top 63 may be provided with access panels 64, 65 which may be removed, as shown in FIG. 7, to permit access to elements within the baghouse 21, for replacement of bags 52 and the like. Wire grill mats 66 may be optionally secured at convenient locations on the exterior of top 63 to facilitate walking thereon.

A bag cleaning mechanism 67 in the form of reverse-air jets 68 respectively directed into the top openings 69 of the bags 52 is provided, as shown in FIGS. 2 and 7, to periodically clean away the dust that accumulates on the outside of the bags 20 during the dust collection process, described further below. Alternatively, or in addition, to back-flushing the bags with air, means can be provided to periodically flex or otherwise mechanically agitate the same.

Figure 6:
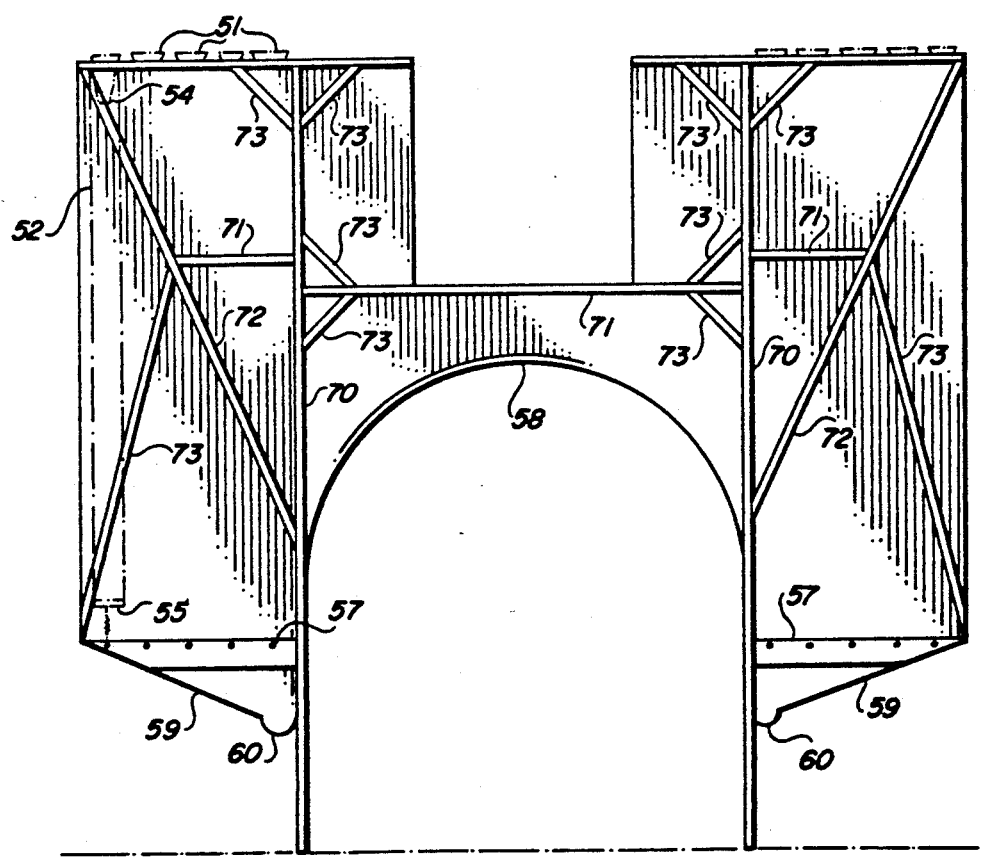
FIG. 6 is a partial section view taken along the line 6—6 of FIG. 3.

FIG. 6 illustrates an internal bracing framework for use in construction of the baghouse 21. Structural support members 70-73 may be welded together appropriately, as shown, at suitable longitudinally spaced intervals to provide the support for the walls of chambers 46 and 47.

The interface between the drum 16 and the baghouse 21 is accomplished by means of the breeching 22 positioned at the intake end 17 of the drum 16, as shown in FIGS. 1-4. The breeching 22 has a lower opening 76 (FIGS. 1 and 2) into the top of the soil intake opening 17 of the dryer 16. The side and rear walls 77, 78 of the breeching 22 diverge rearwardly and upwardly away from the opening 76 to form the back of the baghouse 21, with the interior of the breeching 22 being open at its top into the rearmost part of the central section of the dirty air chamber 46. The opening into the chamber 46 is made larger than the opening 76 from the dryer drum 16, to create the effect of an expansion chamber to slow the velocity of exhausted gases passing from the dryer drum 16 into the baghouse 21, and provide a first dust collection step for the removal of coarse particles from the air.

The limit of the unit 10 from a heat tolerance point of view is dictated by the temperature at which the filter bags 20 will deteriorate. The shape and location of the breeching 22 serves to reduce the bag exposure temperature considerably. The narrow opening 76 (FIG. 2) serves to take advantage of the soil veiling action of the first set of flights 39 inside the drum 16. The soil being raised by the flighting and dropped ahead of the opening 76 as well as the slinging of the soil into the drum at the same location by the belt 18, keep the discharge heat down and act to insulate the baghouse 21. The air is extracted into the central section of the dirty air conduit 46 at an opening 79 (FIG. 2), flows down on both sides of the dryer into the greatly expanded side sections of the chamber 46 toward the bags 20. The expansion of the chamber 46 from its center section outwardly to the sides, provides a second expansion for decreasing the velocity of the exhaust air and precipitating further coarse dust out of suspension. The exhausted air is then drawn up through the bags 52 into the clean air chamber 47, inwardly toward the drum axis, then channeled forwardly, and exited from the stack 25. A damper in the stack automatically regulates the flow of air.

The augers 61 located in the lowest part of the dirty air chamber 46 collect the coarse dust released from the air at the second expansion step and the fines released from the bags during back-flushing. (The coarse dust recouped at the first expansion step is deposited by gravitional action back onto the slinger belt 18 and into the drum.) The recovered dust and the remediated soil are, thus, both delivered to the same discharge location.

The shown baghouse configuration (see FIGS. 2 and 7) has five bags across and 30 bags along each side section of chamber 47, providing an array of 300 bags. This number and configuration may be varied to suit the needs of particular units and particular contaminant removal requirements.

Figure 9:
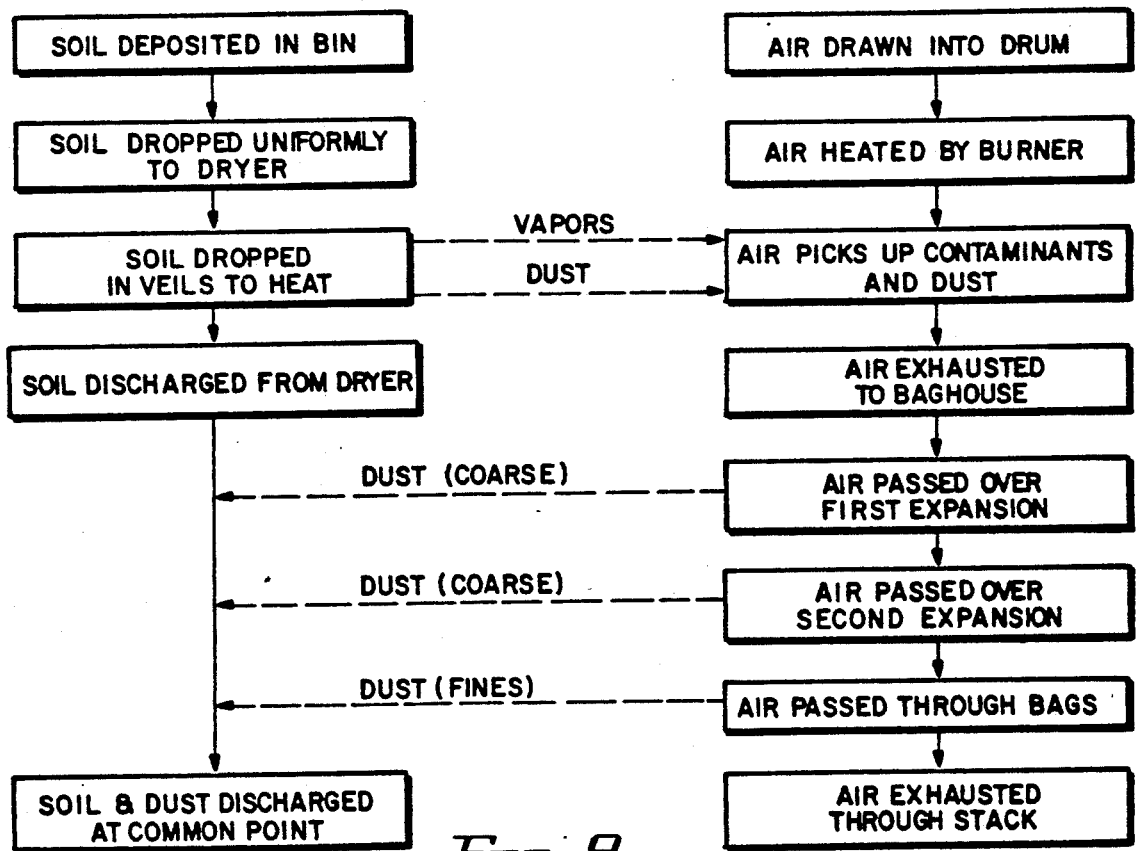
FIG. 9 is a block diagram illustrating the steps of an embodiment of the method of the invention.

The operation of the embodiment of apparatus 10 of the invention illustrated in FIGS. 1-8 can be understood with reference to an embodiment of the method of the invention set forth in FIG. 9.

The apparatus, as a single integrated unit 10 mounted on a trailer platform 11, is transported to a clean-up site and support legs 14 are lowered to give the desired operating incline to the dryer 16.

Soil contaminated with volatile hydrocarbons, or other volatile contaminants, is fed by a front end loader or other similar soil elevating implement through the grizzly 33 into the sloped wall feeder bin 20, and metered by means of auger 19 onto conveyor belt 18 (FIG. 1). A weighing station 35 ensures that the soil is dispensed uniformly at a rate compatible with the soil remediation capacity of unit 10. The belt 18 acts to sling the soil into the elevated end 17 of the drum, where flighting 39 (FIG. 3) interiorly of the drum lifts the soil and drops it in veils through air drawn in at the other end of the drum and heated by the flame of oil burner 30 (see arrows in FIGS. 1 and 2).

Heat mixing with the soil causes the evaporation into the draft air of the volatile contaminants as the soil, rotated and dropped in the drum 16, passes down the incline to be discharged from an opening 27 at the lower end of the drum 16, into a laterally directed chute 43 (FIG. 5).

Dust-laden air exhausted from the baghouse by vacuum action with the aid of fan 23 (FIG. 1) exits the drum 16 through the small opening 76 into the expanding interior of the rear breeching 22 (see lower upwardly directed arrows in FIGS. 1 and 2). The decrease in velocity of the exhausted air due to the expansion of the breeching chamber causes some coarser dust particles to come out of suspension and drop back into the drum 16. The exhausted air then passes upward into the rear opening 79 (FIG. 2) of the central section of the dirty air chamber 46 of the baghouse 21. As the air moves along the converging path of the central section, it drops down to the expanded right and left sides of the chamber 46, located on either side of the drum 16 (FIG. 2). The expansion results in a second decrease in air velocity that further recovers some of the coarser suspended dust particles into the bottom of the side sections of chamber 46.

The air is then drawn from the dirty air chamber 46 into the clean air chamber 47, through the filter fabric of the bags 52 and the openings 51. After removal of the fine dust particles from the air by the bags 52, the air is passed to the central section of the chamber 47 and forwardly to the stack 25, where it is exhausted into the atmosphere, or otherwise disposed of in an environmentally acceptable manner.

The bags 52 are periodically back-flushed by means of the reverse-air jets 68, to release the accumulated dust to the floor 59 of the chamber 46. The dust deposited in this manner and by expansion in chamber 46 collects in the low-point channels 60 and is carried by means of augers 61, 62 (FIG. 5) to chute 43, serving as a common deposition point for both the recovered dust and for the cleaned soil discharged from the drum lower end opening 27. Auger 44 in chute 43 carries the same to a convenient location for reuse or removal from the site.

It can, thus, be appreciated by reference to the foregoing detailed examples of implementation of the invention that the invention provides a compact, readily transportable system for the heat clean-up of contaminated soils. It will be appreciated by those skilled in the art to which the invention relates that various substitutions and modifications may be made to the given examples without departing from the spirit and scope of the invention, as defined by the claims below.

What is claimed is:

1. Readily transportable, compact soil remediation apparatus, comprising:
   a movable elongated platform;
   a feeder bin located on said platform for receiving a quantity of soil having volatile contaminants therein;
   a dryer, comprising a rotatable cylindrical drum coaxially mounted on said platform;
   a burner;
   means for delivering a quantity of said contaminated soil from said feeder bin to said dryer drum;
   means for rotating said drum, including flighting for elevating said quantity of soil and dropping the same in veils in the interior of said drum for heating by said burner and evaporating said contaminants from said soil;
   means for drafting air through said drum to carry said evaporated contaminants away from said drum;
   means positioned on said platform in straddling relationship over said dryer for receiving the air drafted through said drum and removing dust particles suspended therein; and
   means discharging said quantity of soil from said drum after removal of said contaminants therefrom.

2. Soil remediation apparatus comprising:
   an elongated drum having an intake end and a discharge end;
   means for delivering a quantity of soil having volatile contaminants therein into said inlet end of said drum;
   a burner associated with said drum for directing heat into said drum;

means for rotating said drum and mixing said delivered soil with heat from said burner to evaporate said contaminants from said soil;

means for discharging said soil from said discharge end of said drum after removal of said contaminants;

means for drafting said evaporated contaminants in a flow from said drum; and means, including a plurality of fabric filters, positioned in straddling relationship over said drum for removing dust particles from said contaminants flow.

3. Soil remediation apparatus as in claim 2, wherein said dust removing means comprises a baghouse having a plurality of filter bags hung therein.

4. Soil remediation apparatus as in claim 3, wherein said baghouse is divided into dirty air and clean air chambers separated by a partition having a plurality of apertures located therein, and said filter bags are respectively hung from said apertures in arrays of rows and columns arranged in general tangential positions on opposite sides of the elongation of said drum.

5. Soil remediation apparatus as in claim 4, wherein said dirty air chamber has a bottom, and wherein each bag has an open top and a closed bottom, further comprising means hanging each said bag at its top from said partition and means attaching each said bag at its bottom to said dirty air chamber bottom.

6. Soil remediation apparatus as in claim 5, wherein said means attaching said bag at its bottom to said dirty air chamber bottom comprises spring means biasing said bag into a vertical position.

7. Soil remediation apparatus as in claim 5, wherein said means hanging the bag at its top comprises said apertures being provided with upwardly projecting flanges, said tops of said bags being provided with cuffs which are fitted about said flanges, and horns respectively inserted from the tops into said bags at said apertures to secure said bags to said partition.

8. Soil remediation apparatus, comprising:
an elongated drum having an intake end and a discharge end;
means for delivering a quantity of soil having volatile contaminants therein into said inlet end of said dryer;
a burner associated with said drum for directing heat into said drum;
means for rotating said drum and mixing said delivered soil with heat from said burner to evaporate said contaminants from said soil;
means for discharging said soil from said discharge end of said drum after removal of said contaminants;
means for drafting said evaporated contaminants in a flow from said drum; and
a baghouse positioned in straddling relationship over said drum, and having a plurality of filter bags hung therein for removing dust particles from said contaminants flow;
said baghouse being divided into upper and lower compartments, each having a central wedge-shaped longitudinal channel section located over and running parallel to the elongation of said drum and each having let and right sections opening laterally outward from said central sections, the lower compartment left and right sections also extending downwardly from said lower compartment central section.

9. Soil remediation apparatus as in claim 8, wherein said central section of said lower compartment has upper and lower walls that converge to a closed end in the direction of said outlet end of said dryer.

10. Soil remediation apparatus as in claim 9, wherein said central section of said upper compartment has upper and lower walls that diverge to an opening in the direction of said outlet end of said dryer.

11. Soil remediation apparatus as in claim 10, wherein said upper and lower compartments are separated by a partition having a plurality of apertures located therein, and said filter bags are respectively hung vertically from said apertures in arrays of rows and columns arranged in general tangential positions on opposite sides of the elongation of said drum.

12. Soil remediation apparatus as in claim 11, wherein said means for discharging said soil from said discharge end of said drum comprises conveyor means or discharging said soil from said discharge end to a discharge point, and wherein said lower compartment has a bottom wall comprising floor portions inwardly slanted toward said drum; and further comprising means located at lowermost areas of said slanted portions for delivering dust collected in said lower compartment to said soil discharging conveyor means for discharge to said discharge point.

13. Soil remediation apparatus as in claim 12, wherein said soil discharging conveyor means and said collected dust delivering means each comprises auger means.

14. Soil remediation apparatus as in claim 13, further comprising means for cleaning dust of said filter bags and depositing the same within said collected dust delivering means.

15. Soil remediation apparatus as in claim 10, wherein said drafting means further comprises breeching means positioned at the intake end of said drum, said breeching means having a lower opening connecting to said drum and an upper opening connecting to said lower compartment of said baghouse; said upper opening being larger than said lower opening.

16. Soil remediation apparatus as in claim 16, further comprising a stack extending vertically upwardly from said upper compartment opening.

17. Soil remediation apparatus, comprising:
a movable elongated platform;
a dryer, comprising a rotatable elongated drum, coaxially mounted on said platform;
means mounted on said platform for delivering a quantity of soil having volatile contaminants therein at a controlled rate into said dryer;
a burner mounted on said platform and associated with said dryer for directing heat into said drum;
means mounted on said platform for rotating said drum and mixing said delivered soil with heat from said burner to evaporate said contaminants from said soil;
means mounted on said platform for discharging said soil from said drum after removal of said contaminants;
means mounted on said platform for drafting said evaporated contaminants in a flow from said drum; and
baghouse means mounted on said platform and positioned at least partially in straddling relationship over said drum for removing dust particles from said contaminants flow.

18. Soil remediation apparatus as in claim 17, wherein said platform has a front and a rear; and wherein said soil delivering means comprises a feeder bin mounted on said platform rearwardly of said drum, and conveyor means for delivering said soil from said feeder bin to an intake end of said drum; wherein said burner is mounted forwardly of said drum and comprises means for directing a flame into a discharge end of said drum; and further comprising means mounted on said platform for controlling said rate of soil delivery and said flame.

19. Soil remediation apparatus as in claim 18, wherein said baghouse means comprises a baghouse positioned in straddling relationship over said drum and having a plurality of filter bags hung in arrays of rows and columns arranged in general tangential positions on opposite sides of the elongation of said drum.

20. Soil remediation apparatus as in claim 19, further comprising a sensor located in said baghouse for sensing the temperature therein, and wherein said controlling means further comprises means for controlling said flame in response to the temperature sensed by said sensor.

21. Apparatus as in claim 1, wherein said means positioned in straddling relationship comprises a baghouse positioned in straddling relationship over said drum and having a plurality of filter bags hung therein.

22. Apparatus as in claim 21, wherein said drum has an intake end and a discharge end; said means for delivering soil to said drum comprises means for delivering said soil at said intake end; said means for discharging said soil comprises means or discharging said soil at said discharge end; and said means for drafting air comprises means for drafting air from said discharge end to said intake end and through said veils to said baghouse.

23. Apparatus as in claim 22, wherein said means for drafting air further comprises expansion chamber conduit means for communicating said drafted air between said intake end and said baghouse.

24. Apparatus as in claim 23, wherein said baghouse comprises a central channel running longitudinally of said cylinder and expanded chambers connecting to said channel on opposite sides of said drum; and said filter bags are hung in said expanded chambers.

25. Apparatus as in claim 24, further comprising a sensor located in said baghouse for sensing the temperature therein; and means for controlling said burner in response to the temperature sensed by said sensor.

* * * * *